(12) United States Patent
Perrin et al.

(10) Patent No.: US 8,955,565 B2
(45) Date of Patent: Feb. 17, 2015

(54) SUSPENSION SYSTEM FOR VEHICLE AND TIRE FOR VEHICLE

(75) Inventors: Frédéric Perrin, Beaumont (FR); Nicolas Levy, Clermont-Ferrand (FR)

(73) Assignees: Compagnie Generale des Etablissements, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 1182 days.

(21) Appl. No.: 12/922,302

(22) PCT Filed: Mar. 17, 2009

(86) PCT No.: PCT/EP2009/053156
§ 371 (c)(1),
(2), (4) Date: Dec. 6, 2010

(87) PCT Pub. No.: WO2009/115529
PCT Pub. Date: Sep. 24, 2009

(65) Prior Publication Data
US 2011/0114236 A1    May 19, 2011

(30) Foreign Application Priority Data
Mar. 17, 2008    (FR) ..................................... 08 51697

(51) Int. Cl.
*B60C 11/03*    (2006.01)
*B60G 99/00*    (2010.01)
(Continued)

(52) U.S. Cl.
CPC . *B60G 3/00* (2013.01); *B60C 11/00* (2013.01); *B60C 15/06* (2013.01); *B60C 19/001* (2013.01);
(Continued)

(58) Field of Classification Search
CPC  B60C 11/11; B60C 11/13; B60C 2011/0339; B60C 2011/0341; B60C 2011/0355; B60C 19/001; B60C 2200/46; B60C 2200/462; B60C 2200/4622

USPC ......... 152/209.18, 209.25, 904, 209.5, 154.1; 701/37
See application file for complete search history.

(56) References Cited

U.S. PATENT DOCUMENTS 3,830,275 A * 8/1974 Russell ....................... 152/209.5
8,645,027 B2 * 2/2014 Blondelet et al. ............... 701/49

FOREIGN PATENT DOCUMENTS

DE         3901624    * 8/1989
EP    1 145 936 A1   10/2001
(Continued)

OTHER PUBLICATIONS

"How safe are worn tires?" ConsumerReports.org [online]. Consumer Reports, 2006 [retrieved on Apr. 30, 2014]. Retrieved from Internet: <http://www.consumerreports.org/cro/2012/12/how-safe-are-worn-tires/index.htm>.*

(Continued)

*Primary Examiner* — Eric Hug
(74) *Attorney, Agent, or Firm* — Dickinson Wright PLLC

(57) ABSTRACT

Road-going assembly consisting of a vehicle comprising a front axle and a rear axle, and of a set of tires which are mounted on their mounting rim in order to be fitted to the front axle and the rear axle of this vehicle, the tires of the rear axle having grooves the mean depths of which are at least equal to 3 mm and at most equal to 5 mm, the tires of the front axle having grooves the mean depths of which are greater than 5 mm, this road-going assembly having, at least in the case of the rear axle, static setups (camber, toe-in) of close to zero, that is to say a camber of each wheel-tire assembly on the said axle of between −0.8 degrees and +0.8 degrees and a toe-in at each wheel of between −0.15 degrees and +0.15 degrees, the static setups of the tires of one and the same axle being equal in terms of absolute value and symmetric with respect to a plane perpendicular to the road surface.

10 Claims, 1 Drawing Sheet

(51) Int. Cl.
*B60G 3/00* (2006.01)
*B60C 11/00* (2006.01)
*B60C 15/06* (2006.01)
*B60C 19/00* (2006.01)
*B60G 9/00* (2006.01)

(52) U.S. Cl.
CPC .............. *B60G 9/00* (2013.01); *B60G 2200/46* (2013.01); *B60G 2200/462* (2013.01); *B60G 2200/4622* (2013.01); *Y10S 152/904* (2013.01)
USPC .................. 152/209.25; 152/154.1; 152/904; 701/37

(56) References Cited

FOREIGN PATENT DOCUMENTS

| | | | |
|---|---|---|---|
| FR | 2 902 698 A1 | | 12/2007 |
| FR | 2947234 | * | 12/2010 |
| JP | 5-208602 | * | 8/1993 |
| JP | 2001-39105 | * | 2/2001 |

OTHER PUBLICATIONS

International Search Report (PCT/ISA/210) issued on Jul. 1, 2009, by the European Patent Office as the International Searching Authority for International Application No. PCT/EP2009/053156.

* cited by examiner

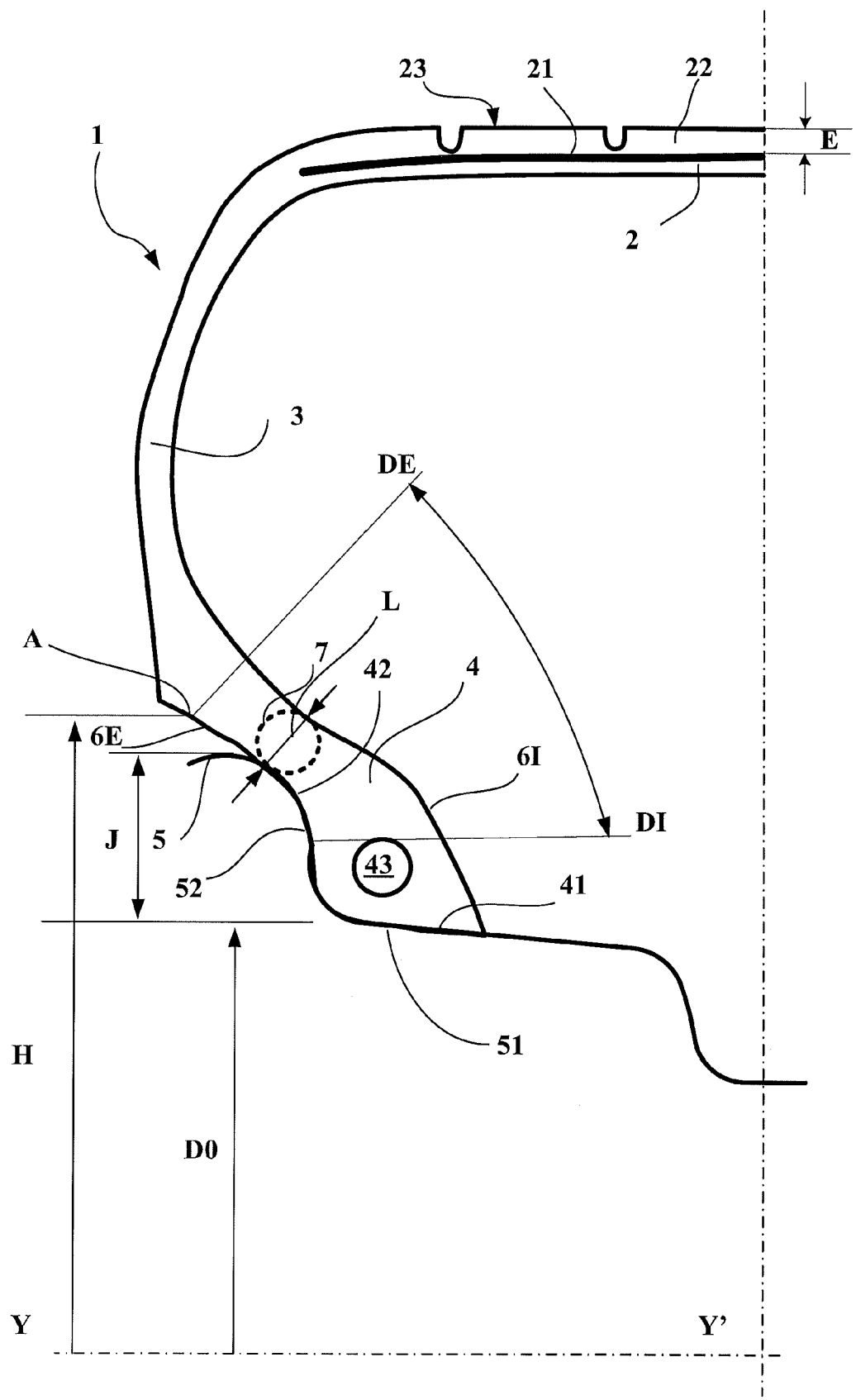

SUSPENSION SYSTEM FOR VEHICLE AND TIRE FOR VEHICLE

The invention relates to road-going assemblies comprising a passenger vehicle comprising a front axle and a rear axle and a set or collection of tires to be fitted to these axles and, more particularly, to the specific assembly conditions required in order to achieve enhanced rolling resistance performance without thereby degrading the wear performance of the tires.

The way in which passenger vehicles have evolved over the past fifteen years, within the same ranges, now means that the total mass of the rolling assembly has increased and the centre of gravity of the vehicle has shifted further away from the ground and further towards the front of the vehicle. This has meant an appreciable increase in the difference between static and dynamic loadings on the axles, load being shifted away from the rear axle at the expense of the front axle. The rear axle is now relatively lightly loaded under static conditions, and is very much unloaded under braking.

By definition, each wheel of an axle of a vehicle makes an angle, known as a steering angle, with a plane perpendicular to the ground and parallel to the direction of forward travel of the vehicle. When, on one and the same axle, the planes of the wheels of this axle converge to intersect towards the front of the vehicle, the angle is said to be toe-in.

In order for a vehicle to maintain good stability during sudden manoeuvres of the braking, obstacle avoidance, lane-change type for example, without in any way losing out on driveability and responsiveness, the rear toe-in has changed from relatively small values of the order of 0.1 degree of toe-in at each wheel, to higher values ranging from 0.3 degrees to 0.45 degrees according to the vehicle loading conditions.

This value of toe-in is applied symmetrically to the two rolling assemblies (wheel and tire) of the rear axle. This setup is of no benefit when driving in a straight line; it allows the vehicle to be prepared for a disturbance in the path of the vehicle by placing a wheel in a turning configuration that will encourage the vehicle to return to a straight line while at the same time preloading the tire concerned in order to make it more responsive and allow it to generate appropriate transverse return thrust.

Of course, this setup is not without impact on rear axle tire wear. It is known that in order to have even and uniform wear across the entire width of the tread of the tires of this axle, a static reverse camber angle can be combined with this toe-in. The camber angle of a wheel is the angle that the plane of the wheel makes, in a plane perpendicular to the ground and containing the axis of the wheel, with the mid-plane of the vehicle. The camber is said to be reverse camber (or negative camber) when the plane of the wheels of one and the same axle intersect above ground level.

However, these static setups of the wheels of the rear axle generate accelerated wear and a drag load that eats up energy by increasing the rolling resistance of the rolling assembly.

In order to combat the increase in wear, work has been carried out into developing tread materials that have improved resistance to wear. These solutions, although satisfactory, have now reached their limits because, on the one hand, material performance has improved and, on the other hand, the static setups continue to be enhanced, still for the same reasons.

It is an object of the invention to reduce the fuel consumption of a vehicle by reducing the rolling resistance of this vehicle, by determining a new combination of static setups for the vehicle and appropriate tires.

A road-going assembly according to the invention consists of a vehicle comprising a front axle and a rear axle, and of a set of tires mounted on their mounting rims to be fitted to the front axle and to the rear axle of this vehicle. Each tire of this vehicle comprises a crown region extended laterally by sidewalls which connect to beads intended to be in contact with a mounting wheel; each tire comprises a carcass reinforcement running from one bead to another bead via the sidewalls and the crown of the tire, the crown region comprising a reinforcement surmounted radially on the outside by a tread.

This tread comprises, radially on the outside, a tread surface intended to come into contact with the road surface when the vehicle is running, a plurality of grooves being formed in the thickness of the tread.

This road-going assembly is such that, in the as-new state, the thickness of the treads of the tires of the rear axle is less than the thickness of the treads of the tires of the front axle. The thickness of a tread is measured as being the mean distance separating the radially outermost surface of the crown reinforcement of a tire and the tread surface of the tread in the as-new state. Furthermore, the depths of the grooves of the treads of the tires fitted to the rear axle are at least equal to 3 mm and at most equal to 5 mm while the depths of the grooves of the treads of the tires fitted to the front axle are at least equal to 5 mm, the depths of the grooves of the treads of the front axle being greater than the depths of the grooves of the treads of the rear axle.

Furthermore, the vehicle has, at least in the case of the rear axle, static setups (camber, toe-in) of close to zero, that is to say a camber of each wheel-tire assembly on the said axle of between −0.8 degrees and +0.8 degrees and a toe-in at the wheel of between −0.15 degrees and +0.15 degrees, the static setups of the rear wheel-tire assemblies being equal in terms of absolute value and symmetric with respect to a plane perpendicular to the road surface.

The difference in depth of the deepest grooves between the tires of the rear axle and the tires of the front axle corresponds to the difference in the thicknesses of the treads of these tires.

The road-going assembly according to the invention allows an appreciable reduction in the energy consumption of the vehicle thanks to the combination of tires that have treads of reduced thickness by comparison with the customary thicknesses and the near-elimination (or even complete elimination) of toe-in static setups.

Furthermore, it has been found, surprisingly, that this combination carried no penalty in terms of tire wear: thus, when used on a vehicle with the recommended static setups, tires with a tread of reduced thickness still had a service life substantially equivalent to that of conventional tires with conventional tread thickness on a vehicle with a high toe-in. The full environmental benefit can be seen here given that for the same distance covered the amount of rubber compound used is appreciably reduced.

Advantageously, the grooves of the treads of the tires fitted to the front axle have depths at least equal to 5 mm and at most equal to 8 mm, the smallest of the differences between the depths of the grooves of the treads of the tires fitted to the front axle and the depths of the treads of the tires fitted to the rear axle being at least equal to 1.5 mm.

In this document, the word "groove" means an elongate cavity or cutout that has a width such that its opposing walls cannot come into contact with one another or, alternatively, a cutout the opposing walls of which can come into contact with one another (in the latter case, we are dealing with what we term an "incision").

Furthermore, it has been found that the invention could advantageously be combined with a level of grooved area of the treads of the tires of the rear axle at most equal to 24% and less than the level of grooved area of the treads of the tires of the front axle. This level of grooved area is equal to the ratio of the surface area of the grooves with respect to the total surface area of the tread; when this level of grooved area is equal to zero, it may be considered that there are no grooves, and when this level is equal to 50%, that means that the surface area of the grooves is substantially equal to the surface area of the material that makes up the tread that can come into contact with the road surface. The invention therefore makes it possible, for the same amount of wear, to increase appreciably the area of contact between the tire and the road surface for the same size of tire and the same vehicle, something which is beneficial in use, notably in terms of road holding.

In order to obtain good performance when driving on a road surface covered with water, it is advantageous to combine this rear axle level of grooved area of at most 24% with front tires the treads of which have a level of grooved area of at least 25%.

In order to achieve good balance in driving, it is advantageous to mount on the rear axle tires the transverse rigidity of the tread of which is at least equal to the transverse rigidity of the tread of the tires of the front axle and at most equal to 1.4 times this transverse rigidity of the tread of the tires of the front axle. The transverse rigidity of a tread corresponds to the rigidity of that part of the tire that lies radially between the outside of the crown reinforcement and the tread surface of the tire in the as-new state. This rigidity can be measured experimentally by isolating the tread from the tire or alternatively by numerical simulation.

The transverse rigidity of a tire is measured under the nominal conditions of use laid down by the E.T.R.T.O. (European Tire and Rim Technical Organization) standards. To do that, the tire the transverse rigidity of the tread of which is to be measured (the part contained between the crown reinforcement of the tire and the surface of the tread) is mounted on its mounting rim and then inflated to its nominal pressure and a nominal load is applied to it. With the tire thus pressed firmly onto a grippy surface, the ground onto which the tire is pressed is made to move in a direction parallel to the axis of rotation and the corresponding load is measured. The curve that links load as a function of the imposed movement allows the transverse rigidity to be evaluated near the origin of the said curve.

For preference, in addition to the rear axle, the front axle also has static setups (camber, toe-in) which are close to zero, that is to say that the camber of each wheel-tire assembly on the said axle is between −0.8 degrees and +0.8 degrees and that the toe-in at each wheel is between −0.15 degrees and +0.15 degrees, the static setups of the wheel-tire assemblies of one and the same axle being equal in terms of absolute value and symmetric with respect to a plane perpendicular to the road surface.

Advantageously, the road-going assembly according to the invention is such that the tires of the rear axle are inflated to an inflation pressure higher than the inflation pressure of the tires of the front axle, the difference in pressure being at least equal to 0.4 bars.

In another preferred variant, the road-going assembly according to the invention uses tires on the front axle and on the rear axle which are the same size, this size being defined by the E.T.R.T.O. standard, which allows identical size markings to be used on each of the tires, except for the position of the said tires on the vehicle.

Further features and advantages of the invention will become apparent from the description given hereinafter with reference to the single attached drawing which, by way of non-limiting example, illustrates one embodiment of a tire that forms the subject of the invention.

FIG. 1 shows a cross section through a tire used to achieve the configuration of the invention.

The single FIGURE appended to this description shows a partial view of a radial tire 1 used in the combination according to the invention, this tire being mounted on a mounting rim 5 and inflated to its service pressure. This tire 1 viewed in a meridian plane of section, that is to say in a plane containing the axis of rotation (YY'), comprises a bead 4 in contact with the mounting rim 5, this bead 4 being extended radially outwards by a sidewall 3, the latter ending in a crown part 2.

The mounting rim 5 comprises a seat 51 which is inclined with respect to the direction of the axis of rotation YY', this rim seat being intended to have the bead seat 41 pressing against it. The rim seat 51 is extended axially and radially outwards by a rim flange 52 against which the bead of the tire can press. The nominal diameter (Do) of the rim is measured in accordance with the stipulations of the E.T.R.T.O. (European Tire and Rim Technical Organization) standard substantially at the point where the rim seat and the rim flange meet. The height (J) of the rim flange is equal to half the difference between the diameter of the circle centered on the axis of rotation and passing through the points of the flange that are radially furthest from the said axis and the nominal diameter (Do).

This tire comprises a carcass reinforcement, not shown in this FIGURE, which is formed of a plurality of reinforcing elements that make an angle equal or close to 90 degrees with a direction tangential to the circumferential direction (that is to say a direction perpendicular to the plane of section of FIG. 1). Moreover, this crown part is reinforced by a crown reinforcement 21 surmounted by a tread 22 which has a radially external surface intended to come into contact with the road surface during running (and it is this radially external surface that is known as the tread surface 23).

This tread 22 has a mean thickness E, measured as the mean distance between the tread surface 23 and the radially outermost surface of the crown reinforcement 21. This tread is provided with a plurality of elements in relief which are delimited by grooves of circumferential and meridian orientation (in the direction YY'). The ratio between the total area of the grooves and the total area of the contact patch of the tire (the latter being obtained as being the surface delimited by the outermost contour of the said contact patch) is known as the groove ratio.

The bead 4 is reinforced by a reinforcement 43 in the circumferential direction and around which the carcass reinforcement is anchored. The bead is bounded by an internal surface (against which the inflation pressure acts) and an external surface (partially in contact with the rim flange). These internal and external surfaces intersect the plane of FIG. 1 along an internal profile 6I and an external profile 6E, respectively.

A thickness dimension (L) is defined for this bead as being the minimum thickness of the bead between the part radially furthest outside the circumferential reinforcement 43 (delimited by a straight line DI parallel to the axis of rotation) and a straight line DE perpendicular to the internal profile 6I and passing through a point A situated at a distance H from the axis of rotation equal to the value (expressed in mm) of the radius of the circle centered on the axis of rotation and passing through the radially outermost points of the rim flange, increased by 5 mm. In this instance, the height (J) of the rim flange is equal to 17.2 mm.

This dimension (L) is, in practice, measured as follows: (L) is equal to the maximum diameter of a circle 7 wholly contained between the internal 6I and external 6E bead profiles between the straight line DI and the straight line DE. For preference, this dimension (L) is at most equal to 11 mm for commonplace passenger car tire sizes.

Usually, this dimension (L) varies according to the rim diameters, these diameters being expressed in inches ("), one inch being equal to 25.4 mm. This dimension (L) observes the limits given in Table 1 below:

TABLE 1

| Diameter at the bead seat | L |
|---|---|
| ≤13" | 8 mm |
| 14" | 8.5 mm |
| 15" | 8.5 mm |
| 16" | 9.5 mm |
| 17" | 9.5 mm |
| 18" | 10 mm |
| 19" | 10 mm |
| >19" | 10.5 mm |

Fuel consumption readings were taken when running with one and the same vehicle in order to compare a reference configuration according to the prior art against a configuration according to the invention.

In the reference configuration, the running test is performed using an Alfa Roméo 156 SW GTA 3.2 1 V6 (front-wheel drive) with its original manufacturer settings, namely:

Front axle toe-in: −1.2±0.5 mm, namely −0.16° at the wheel (here we have negative toe-in, that is to say toe-out)

Front axle camber: −0° 50' at the wheel

Rear axle toe-in: +1.6±0.5 mm, namely 0.21° at the wheel

Rear axle camber: −1° 20' at the wheel

The tires mounted on the front axle and on the rear axle were tires of the same size: 225/45 R17 94W.

The tires on the front axle have the following characteristics:

Groove depth 8 mm (that is groove depth in the as-new state);

Distance between the bottom of the grooves and the outside of the crown reinforcement: 1.8 mm;

Tread thickness: 9.8 mm

Level of grooved areas: 30% (ratio between the area of grooves and the total area of the contact patch under service pressure and nominal load);

Cold inflation pressure: 2.5 bar

The tires of the rear axle have the following characteristics:

Groove depth 8 mm (=depth of grooves in the as-new state of the tire);

Distance between the bottom of the grooves and the outside of the crown reinforcement: 1.8 mm;

Tread thickness: 9.8 mm

Level of grooved area: 30%;

Cold inflation pressure: 2.3 bar.

In the configuration according to the invention, the same running test was performed using the same vehicle, but with the setups changed to:

Front toe-in: 0°

Front camber: 0°

Rear toe-in: 0°

Rear camber: 0°

The tires of the front axle have the following characteristics:

Groove depth in as-new state: 6.4 mm;

Distance between the bottom of the grooves and the outside of the crown reinforcement: 1.8 mm;

Tread thickness: 8.2 mm

Level of grooved area: 27%;

Cold inflation pressure: 2.5 bar

The tires of the rear axle have the following characteristics in the as-new state:

Groove depth in the as-new state: 4 mm

Distance between the bottom of the grooves and the outside of the crown reinforcement: 1.8 mm;

Tread thickness: 5.8 mm

Level of grooved area: 22%;

Cold inflation pressure: 2.8 bar;

Narrower beads, that is to say beads with a dimension L equal to 7.5 mm (namely 71% of the same dimension L of the tires of the reference configuration).

With each of these two configurations, the vehicle was driven over a distance of 78 km at a stabilized speed of 100 km/h, with the following distribution of load between the front axle and the rear axle: front axle load 900 daN, rear axle load 700 daN.

During each run, fuel consumption was measured every 7.8 km. An average fuel consumption was evaluated from these ten measurements.

The fuel economy with the configuration according to the invention as compared with the reference configuration, for a stabilized speed of 100 km/h, was of the order of 0.24 liters per 100 kilometers covered, namely a fuel consumption saving of 2.38%.

|  | Consumption in litres/100 km |
|---|---|
| Reference configuration | 10.07 |
| Invention | 9.83 |

Furthermore, rolling resistance measurements were taken for each configuration. These measurements were taken for each tire mounted on its rim and at its vehicle load and pressure conditions used for the fuel consumption measurements.

The rolling resistance was measured in accordance with the method described in the standard ISO 18164 using the conditions used on the test vehicle by running each wheel-tire assembly on a flywheel at a stabilized speed of 80 km/h.

Table 2 below gives the average values for each position on the vehicle for the reference configuration and the configuration of the invention:

TABLE 2

|  | Rolling resistance front tire | Rolling resistance rear tire |
|---|---|---|
| Reference | 9.00 kg/T | 9.52 kg/T |
| Invention | 8.65 kg/T | 6.83 kg/T |

These measurements show that the configuration according to the invention provides a saving in rolling resistance with respect to the reference configuration. This saving can be enumerated at 1.55 kg/T per tire at 80 km/h (the average of the tires from the two axles). This result corresponds to the mean of the rolling resistance of a tire of the front axle measured at its service pressure and at the load corresponding to the load on the tire on this axle for the vehicle in question (axle load of 450 daN and inflation pressure of 2.5 bar) and of the rolling resistance of a rear tire measured at its service pressure and at the load corresponding to the load on the tire on the vehicle (axle load of 350 daN and inflation pressure of 2.3 bar for the reference configuration and 350 daN and 2.8 bar for the configuration according to the invention).

For preference, the dimension L of the tires in the combination according to the invention has to observe the upper limits given in Table 3 below as a function of rim diameter:

TABLE 3

| Diameter at the bead seat | L |
|---|---|
| ≤13" | 7.5 mm |
| 14" | 8 mm |
| 15" | 8 mm |
| 16" | 8 mm |
| 17" | 8 mm |
| 18" | 8.5 mm |
| 19" | 9 mm |
| >19" | 9.5 mm |

For preference, with the tread of each tire being provided with a plurality of grooves delimiting elements in relief, the groove ratio (that is to say the ratio between the area of sunken regions and the total surface area of the contact patch under service pressure and nominal load) is at most equal to 24% of the total area of the tread.

Advantageously, and as was done in the case of the tests set out here, it is sensible to combine with this invention an inflation pressure that is higher than the inflation pressure of the tires of one and the same vehicle that retains high static setups. It is thus advantageous for the tires of the rear axle to be inflated to an inflation pressure higher than the pressure to which the tires of the front axle are inflated, the difference in pressure being at least equal to 0.4 bar.

The invention is not restricted to the exemplary embodiments described and depicted and various modifications can be made thereto without departing from its scope.

The invention claimed is:

1. A road-going assembly comprising a vehicle comprising a front axle and a rear axle, and of a set of tires which are mounted on their mounting rim in order to be fitted to the front axle and the rear axle of this vehicle, each tire of this vehicle comprising a crown region extended laterally by sidewalls which connect to beads intended to be in contact with a mounting wheel, each tire comprising a carcass reinforcement running from one bead to another bead via the sidewalls and the crown of the tire, the crown region comprising a reinforcement surmounted radially on the outside by a tread, this tread comprising, radially on the outside, a tread surface intended to come into contact with the road surface when the vehicle is running, a plurality of grooves being formed in the thickness of the tread, wherein:

the depths of the grooves of the treads of the tires fitted to the rear axle are at least equal to 3 mm and at most equal to 5 mm, the depths of the grooves of the treads of the tires fitted to the front axle are at least equal to 5 mm, the depths of the grooves of the treads of the front axle being greater than the depths of the grooves of the treads of the rear axle, and at least in the case of the rear axle, the static setups comprising camber and toe-in are close to zero, such that a camber of each wheel-tire assembly on said axle of between −0.8 degrees and +0.8 degrees and a toe-in at the wheel of between −0.15 degrees and +0.15 degrees, wherein the static setups of the rear wheel-tire assemblies are equal in terms of absolute value and symmetric with respect to a plane perpendicular to the road surface, the grooved area of the treads of the tires of the rear axle have a level that is at most equal to 24% and is less than a level of grooved area of the treads of the tire of the front axle, this level of grooved area being equal to the ratio of the surface area of sunken regions to the total surface area of the tread.

2. The road-going assembly according to claim 1, wherein the grooves of the treads of the tires fitted to the front axle have depths at least equal to 5 mm and at most equal to 8 mm, wherein the smallest of the differences between the depths of the grooves of the treads of the tires fitted to the front axle and the depths of the treads of the tires fitted to the rear axle is at least equal to 1.5 mm.

3. The road-going assembly according to claim 1, wherein the level of grooved area of the treads of the tires of the front axle is at least equal to 25%.

4. The road-going assembly according to claim 1, wherein the transverse rigidity of the tread of the tires of the rear axle under the nominal conditions of use laid down by the E.T.R.T.O. (European Tire and Rim Technical Organization) standards is at least equal to the transverse rigidity of the tread of the tires of the front axle and at most equal to 1.4 times the transverse rigidity of the tread of the tires of the front axle.

5. The road-going assembly according to claim 1, wherein in the static setups comprising camber and toe-in of the front axle are close to zero, such that the camber of each wheel-tire assembly on the said axle is between −0.8 degrees and +0.8 degrees and that the toe-in at each wheel is between −0.15 degrees and +0.15 degrees, wherein the static setups of the tires of the front axle are equal in terms of absolute value and symmetric with respect to a plane perpendicular to the road surface.

6. The road-going assembly according to claim 1, wherein the tires of the rear axle are inflated to an inflation pressure higher than the inflation pressure of the tires of the front axle, the difference in pressure being at least equal to 0.4 bar.

7. The road-going assembly according to claim 1, wherein each bead of the tires of the rear axle has a minimum width (L) at most equal to 11 mm, this minimum width being defined as being the minimum thickness of any cross section of the bead lying between the bead wire and a point situated radially on the outside and at a distance (H) from the axis of rotation equal to the value, expressed in millimeters, of the radius of the circle centered on the axis of rotation and passing through the radially outermost points on the rim flange, increased by 5 mm.

8. The road-going assembly according to claim 7, wherein, according to the diameter at the bead seat, the minimum width L of the beads is less than the corresponding value given in the table:

| Diameter at the bead seat | L |
|---|---|
| ≤13" | 8 mm |
| 14" | 8.5 mm |
| 15" | 8.5 mm |
| 16" | 9.5 mm |
| 17" | 9.5 mm |
| 18" | 10 mm |
| 19" | 10 mm |
| >19" | 10.5 mm. |

9. The road-going assembly according to claim 7, wherein, according to the diameter at the bead seat, the minimum width L of the beads is less than the corresponding value given in the table:

| Diameter at the bead seat | L |
|---|---|
| ≤13" | 7.5 mm |
| 14" | 8 mm |
| 15" | 8 mm |
| 16" | 8 mm |
| 17" | 8 mm |
| 18" | 8.5 mm |
| 19" | 9 mm |
| >19" | 9.5 mm. |

10. The road-going assembly according to claim 1, wherein the size of the tires of the front axle is the same as the size of the tires of the rear axle, the size of a tire being defined by the E.T.R.T.O. standard.

* * * * *